C. STEFFEN.
PROCESS OF TREATING POTATOES.
APPLICATION FILED NOV. 24, 1906.
1,006,312.
Patented Oct. 17, 1911.
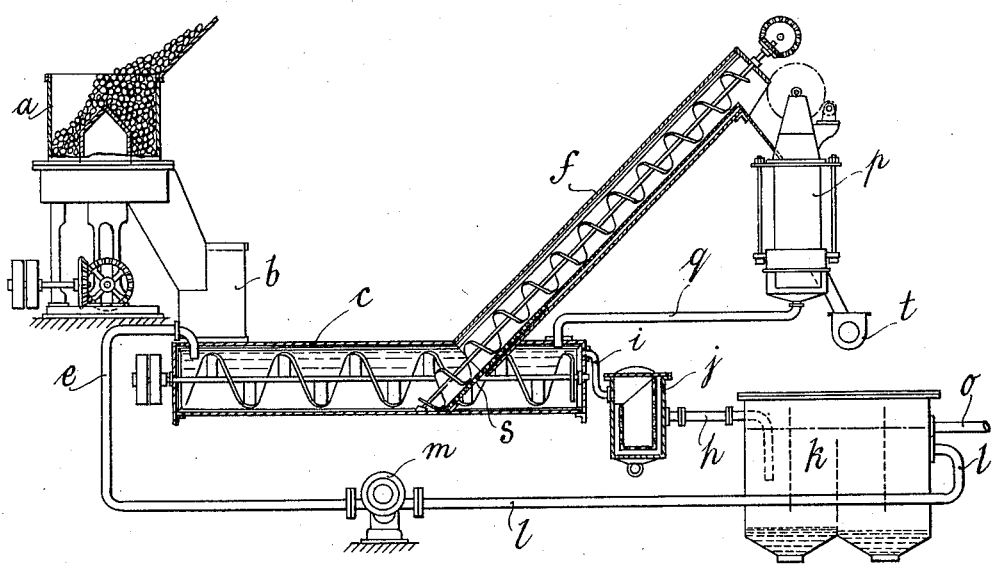

UNITED STATES PATENT OFFICE.

CARL STEFFEN, OF VIENNA, AUSTRIA-HUNGARY.

PROCESS OF TREATING POTATOES.

1,006,312.  Specification of Letters Patent.  Patented Oct. 17, 1911.

Application filed November 24, 1906. Serial No. 344,914.

*To all whom it may concern:*

Be it known that I, CARL STEFFEN, engineer, a subject of the Emperor of Austria-Hungary, residing at 40 Heugasse, Vienna, Austria-Hungary, have invented new and useful Improvements in Processes of Treating Potatoes, of which the following is a specification.

This invention relates to a process of treating potatoes with the object of obtaining starch therefrom.

The present process of treating potatoes consists in employing primarily fruit water or potato juice of the potato in its natural, diluted, or concentrated state as a washing liquor for extracting starch from potatoes reduced to chips or fine slices or the like; and secondarily in utilizing this washing liquor for enriching the final product, the starch being only partially extracted and thus producing a final yield of a food stuff of high nutritive value and at the same time obtaining a material quantity of starch of the best quality. The washing liquor, which, as specified, consists of the fruit water or potato juice, will be hereinafter termed "washing juice" and should be used in sufficiently large quantities as compared with the mass of pieces, portions or slices of potatoes to effect the desired partial extraction of the starch, the uncovered or cut cells of the pieces or portions of potatoes permitting the starch to be exposed on the surfaces of the portions or pieces and absorbed or taken up by the washing juice and the starch finally separated from the latter in the usual manner by precipitation or filtration. The pieces or portions of potatoes which are partially deprived of their starch are then subjected to a juice extracting or separating process in suitable presses or like apparatus, and the potato juice expressed from the pieces or portions of potatoes may be used as the washing juice for washing out the starch from the pieces or portions of potatoes subjected to further treatment, and this washing juice, which is preliminarily prepared, is repeatedly employed to successively take up starch during each washing operation or in accordance with the reuse of the washing juice in extracting the starch from the pieces or portions of potatoes. The washing liquid or juice preliminarily employed will be increased in quantity by the addition thereto of the expressed potato juice or by the juice liberated from the pieces or portions of potatoes by pressure and a proportionate quantity of the juice rich in starch will be separated from the washing system or apparatus at intervals and be deprived, as far as possible, of the starch carried thereby and the solid matter separated therefrom by known methods. The potato juice at times inspissated, by evaporation may also be mixed for impregnating purposes with the pressed potato portions or pieces before or after the latter are fed into the drying apparatus.

It is to be understood that in properly carrying out the process not more than forty per cent. of the starch contained in the potato should be extracted, the preferable percentage being thirty-three per cent., which can be regulated by the thickness of the pieces or portions of potatoes and the quantity of washing juice employed, the crude starch separated from the fruit water being washed with water in the usual manner.

To assist in carrying out the process the apparatus shown in diagram in the accompanying drawings is employed, and referring thereto $a$ designates a cutting or slicing machine to which the whole potatoes after being thoroughly washed are fed and reduced thereby to small pieces or portions or slices. In this reduced condition the potatoes enter the hopper $b$ disposed adjacent to the oulet of the cutting or slicing machine $a$ and forming a part of a mixing tank $c$ having a suitable agitator therein to cause the pieces or portions of potatoes to be regularly fed from the forward to the rear extremity of said tank. The washing juice is supplied to the forward extremity of the tank $c$ by a pipe $e$, and connected to the rear extremity of the tank is an overflow pipe $i$ which runs to a suitable depulper $j$ and from the latter by means of a pipe $h$ to the starch separating apparatus $k$ which may be of any suitable and well known construction and embodying a settling gutter, settling cistern, filter press, etc., and wherein the starch is separated from the liquid. The potato juice freed from the starch is utilized as the washing juice and drawn from the starch separating apparatus through a pipe $l$ by a pump $m$ to which the pipe $e$ is connected. The portions or pieces of potatoes are removed from the tank $c$ by an upwardly inclined conveyer $f$ having its lower end extending into the rear portion of said tank; and in the bottom part of said conveyer sieves *s* are disposed for separating the washing juice from the pieces or portions of potatoes, the washing juice running back into the tank *c*. The upper end of the conveyer *f* is associated with and feeds into the top portion of a press *p* which is utilized for pressing the pieces or portions of potatoes and squeezing the juice therefrom, the juice being conveyed from the lower extremity of the press *p* by a pipe *q* running forwardly and entering the rear extremity of the tank *c*. The pieces or portions of potatoes are not wholly deprived of the water therein by the press *p*, and the pieces or portions of potatoes pass out from the press *p* into a gutter *t* and then conveyed to any suitable drying apparatus and afterward used as food stuff. The potato juice running back through the pipe *q* into the rear extremity of the tank *c* passes with the juice in the tank through the overflow pipe *i* into the depulper *j* and from the latter into the starch separating apparatus *k*, as hereinbefore explained. It will be understood that the liquid drawn through the pipe *l* will contain starch, and the surplus of starchless potato juice in the starch separator *k*, and which is produced by the afflux of the expressed potato juice through the medium of the return flow by pipe *q*, is discharged through the overflow pipe *o* at the upper portion of the separator *k* and is delivered into a suitable apparatus, for instance an evaporating battery, not shown, where it is subjected to inspissation, and if desirable an albumin separating apparatus, such as a heating vessel and filter press, may be connected to the said pipe *o*.

The process will be continuously carried on or the tank fed with pieces or portions of potatoes and agitated and washed to relieve the same of a portion of the starch and then removed from the tank by the conveyer or elevator *f* and delivered into the press *p* and the juice expressed carried back to the tank and united with the juice in the latter for separation treatment in the apparatus hereinbefore explained and for return to the forward extremity of the tank.

It may sometimes be inadvisable to subject the portions or pieces of potatoes taken from the tank *c* to an ordinary pressing operation. In this case the pieces or portions of potatoes one only partly freed from adhering juice, the portions or pieces retaining the adhering starchless washing juice - which is dried therewith, this drying process being carried on at high temperatures to avoid the risk of setting up pasting or agglomeration of the portions or pieces of potatoes. Furthermore, the advantage of the process is that the potato chips are superficially freed from starch and fruit water by the employment of water or starch cleansing water, the latter being substituted at the outset for the fruit water proper. In other words, the first quantity of washing juice used or introduced into the tank *c* may be suitably prepared by any preferred means prior to the first step or first treatment of the pieces or portions of potatoes treated. In preliminarily preparing this washing juice independently of the first step of the process a saving in time will result and the preliminarily prepared washing juice or liquor will become more or less enriched with fruit water exuding from the portions or pieces of potatoes in consequence of the washing process, and takes up the exuded materials and assumes corresponding properties. Under these conditions also and owing to the limited yield of starch sought to be obtained, the required quantity of water need only be about one-third or one-fourth of that which must be employed for carrying out the usual process of washing out the starch in respect of its total output. Thus the quantities of cleansing water, otherwise wasted as sewage, are available as means for carrying out the process. If the water, which has been used once for washing the portions or pieces of potatoes after the starch has been separated therefrom, shall be caused to act repeatedly on the fresh portions or pieces of potatoes in the tank, said water finally becomes concentrated in a high degree by being enriched with soluble solid matter from the potato material and may be finally carried away or separated from the apparatus and subjected to known treatment for the extraction of albumin and inspissated potato juice. A still further change in the main process as hereinbefore described consists in using a previously inspissated, concentrated fruit water for washing the starch instead of ordinary or diluted fruit water. The result of this modification is a kind of impregnation of the pressed residue forming the food stuff which is thus enriched with the same proportion of soluble solid matter as contained in the total amount of juice of the original potato. Before using the concentrated water in the above manner, the same can be deprived of its albumin in the usual manner.

It has been ascertained that starch separated in accordance with the foregoing process from pieces or portions of potatoes is of an excellent quality and that it completely settles in the washing juice easily and rapidly and can be thoroughly cleansed to a dazzling whiteness by means of comparatively small quantities of water.

The dry potato portions or pieces after treatment as above described and in which inspissated potato juice may be incorporated before or after the drying process, forms a more valuable food stuff than ordinary dried potatoes owing to the withdrawal of a portion of the starch prior to the transfer of the entire solid matter to the food stuff, and in view of which also the relation between nitrogenous and non-nitrogenous matter is improved. The residues obtained and used as food stuff are superior to those resulting from the usual manufacture of potato starch because the greater part of the soluble solid matter contained in the juice is conserved and does not pass off with the sewage.

What is claimed is:

A process for treating potatoes which consists in slicing the potatoes, partially extracting the starch from the slices by washing the latter in a bath of initially prepared dilute potato juice, conveying this washing liquid enriched with the starch taken up thereby away from the potato slices and precipitating the starch therein, withdrawing the chips partially freed from starch from the bath and depriving the chips of the surplus liquid, and returning the bath liquid from which the starch has been precipitated to the washing bath.

In testimony whereof I have signed my name to this specification in the presence of two subscribing witnesses.

CARL STEFFEN.

Witnesses:
 HENRY HASPER,
 WOLDEMAR HAUPT.